United States Patent [19]

Bishop et al.

[11] Patent Number: 4,561,516

[45] Date of Patent: Dec. 31, 1985

[54] CONTROL VALVE FOR VEHICLE POWER STEERING SYSTEMS

[75] Inventors: Arthur E. Bishop, P.O. Box 936, Crows Nest, New South Wales, Australia; John Baxter, Chatwood, Australia

[73] Assignee: Arthur E. Bishop, Mosman, Australia

[21] Appl. No.: 646,241

[22] Filed: Aug. 31, 1984

[30] Foreign Application Priority Data

Aug. 8, 1984 [AU] Australia .................. PG6458

[51] Int. Cl.[4] .................. B62D 5/08; F15B 13/14; F16K 11/12
[52] U.S. Cl. .................. 180/142; 137/625.17; 137/625.32; 91/375 A; 251/209
[58] Field of Search .................. 180/141, 142, 143; 137/625.17, 625.3, 625.31, 625.32; 91/375 A, 467, 470; 251/205, 208, 209

[56] References Cited

U.S. PATENT DOCUMENTS

| | | | |
|---|---|---|---|
| 560,803 | 5/1896 | Knapp | 137/625.17 |
| 2,865,219 | 12/1958 | Bishop | 91/380 |
| 3,022,772 | 2/1962 | Zeigler et al. | 91/375 A |
| 3,368,457 | 2/1968 | Lewakowski | 91/375 R X |
| 3,587,646 | 6/1968 | Adams | 137/625.17 |
| 3,591,136 | 7/1971 | Bishop | 251/209 |
| 3,591,139 | 7/1971 | Bishop | 251/367 |

Primary Examiner—Martin P. Schwadron
Assistant Examiner—John S. Starsiak
Attorney, Agent, or Firm—Hill, Van Santen, Steadman & Simpson

[57] ABSTRACT

A hydraulic control valve for a power assisted steering system for a vehicle, of generally conventional construction, the essential features of the valve being a sleeve having a bore in the surface of which are longitudinal extending grooves separated by lands, and a valve core fitting closely within the bore of the sleeve so as to be rotatable in the sleeve and having a second set of longitudinal grooves also separated by lands, each groove of the sleeve lying opposite a land of the core. The width of some at least of the grooves or lands vary along their lengths and the arrangement is such that relative rotation between the valve core and the sleeve member acts to vary the effective width and therefore the area of orifices defined by adjacent edges of opposing grooves and lands, thus controlling the restriction to flow of hydraulic fluid within the valve and thus the power assistance provided to the system, wherein the sleeve member and the valve core are relatively movable axially whereby the lengths of the orifices and thus the areas available for the flow of hydraulic fluid may be changed and the degree of assistance thus altered.

9 Claims, 10 Drawing Figures

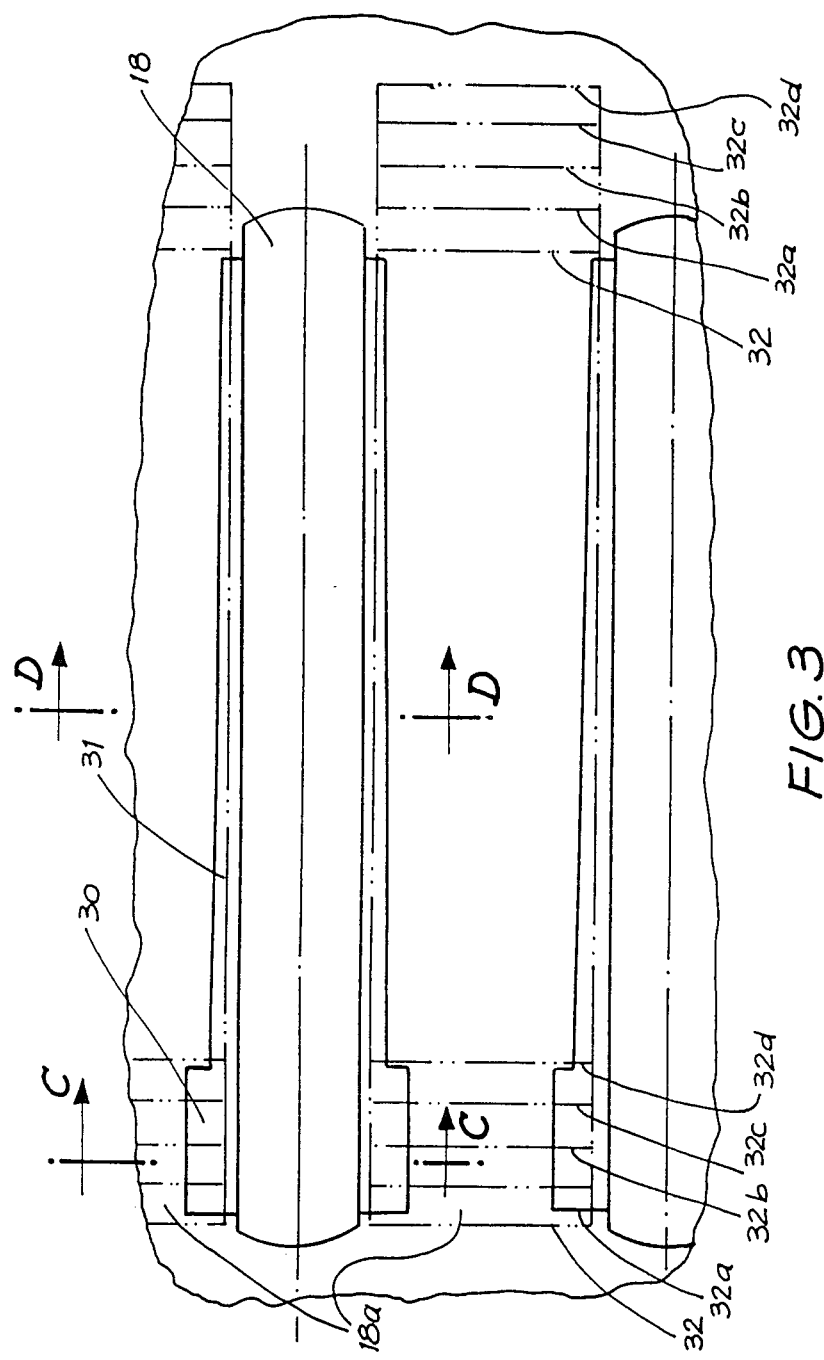

CONTROL VALVE FOR VEHICLE POWER STEERING SYSTEMS

This invention relates to control valves for power assisted steering systems for vehicles, and in particular to control valves for use in systems in which it is deemed desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should be correspondingly minimized to permit the feedback of road "feel" from the tires to the driver. Secondly during medium and high speed passing and cornering maneouvres, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneouvres, the power requirements on the steering system may be large and the fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level of assistance for high to medium speed on-center driving while having high levels of assistance for low speed and parking maneouvres, by exploiting the fact that, for most valves, the degree of assistance varies with the flow of oil. For example, in one such widely used system, the power steering pump is caused to reduce the flow of oil as vehicle speed increases. However this adversely affects valve performance in the second driving condition above, namely medium to high speed passing and cornering maneouvres, where progressive valve response is impaired due to the low oil flow. Also, in the event that such a steering maneouvre requires rapid turning of the steering wheel, the lower pump flow may be inadequate, rendering the power assistance momentarily inoperative.

The most satisfactory method of matching valve performance in all three of the abovementioned conditions is modulating the valve characteristic with vehicle speed. One such speed sensitive valve system designed with this aim in mind is described by F. J. Adams (see S.A.E. Paper 830998, June 6, 1983). This provides a system whereby the valve is held in an inoperative mode by a ball detent arrangement, the effectiveness of which increases with vehicle speed. The ball detent is activated by a separate source of oil under pressure which is communicated via additional grooves and seals to the rotatable valve elements in which the ball detent is housed. This increases the valve friction which is undesirable.

A system which provides for better modulation of power assistance with vehicle speed is that disclosed in U.S. Pat. No. 4,438,827 and can be seen to employ a hydraulic reaction type valve. The characteristics provided by this system are described in Automotive Engineering, Vol. 90, No. 4, April 1982 which shows that the assistance pressure provided by the valve varies in a linear manner when plotted against driver input torque and that the slope of this line is made to vary continuously and smoothly with vehicle speed. Each assistance pressure line so defined starts only after some threshold value of input torque is reached, and terminates at some other point where a further increase in input torque would serve no useful function. The system is however very complicated and increases the rotational friction of the valve assembly as compared with valves not incorporating the speed sensitive feature.

The present invention is based on the widely used torsion-bar-centred rotary valve as first disclosed in U.S. Pat. No. 3,022,772 wherein only three principal valve elements are required: a sleeve member incorporating longitudinal grooves in its bore, a valve core relatively rotatable therein also having longitudinal grooves, and a torsion bar. According to the present invention, an infinite range of assistance pressure lines similar to those above described in Automotive Engineering, Vol. 90, No. 4, April 1982 may be provided but in a simple and low cost rotary valve construction.

The manner by which a simple three element rotary valve may be made to generate the performance characteristics of hydraulic reaction valves is set out in U.S. Pat. No. 3,591,136. In the latter patent the valve core incorporates grooves having edges featured in a very specific geometrical configuration (FIG. 7 of that specification) which includes a "logarithmic scroll" (11d), that provides an exponential area change and therefore a linear increase of assistance pressure with relative rotation of the valve elements. At one end of the groove a pocket (11g) is provided.

The object of the specific groove edge configuration is to provide an orifice area curve (FIG. 6 of that specification) having three principal features: an initial rapid rate of reduction of orifice area for the first part of valve deflection from the centred position, an exponential type further decrease of area up to about 2 degrees, and a final rapid close-off of area. A linear-assistance pressure region having a rate of 250 psi/degree is provided (FIG. 5 of that specification).

In a preferred form of the present invention a similar linear assistance pressure relationship is provided at some intermediate mode of operation of the valve. However, the valve also provides that the slope of this line can be smoothly and continuously changed from a much lower value of say 0.6 MPa/degree for high speed driving, up to say 20 MPa/degree for parking, the latter resulting in substantially lower steering wheel input torques. The compromise in the valve performance of most power steering gears is thus avoided.

The essential feature of the present invention lies in the imparting of an axial movement to the sleeve member along the valve core as a function of, for example, vehicle speed. Relative rotation between the sleeve member and the valve core is utilized as in normal valve operation. The changed characteristics of the valve assembly result from a progressive masking of a section of the groove edges of the valve core.

In preferred forms of the invention the orifice area curve provided by the groove edges of a valve core made according to this invention remain substantially that shown in U.S. Pat. No. 3,591,136, although there are some essential differences. Firstly the "logarithmic scroll" 11d is removed from the elongated edges of the valve groove so that these edges now become approximately parallel to the valve core axis. The "logarithmic scroll" feature, which provides the exponential section of the area curve, is now incorporated in the cross-section of the pocket shown in FIG. 3a of that specification. The elongated edges (now approximately straight) are preferably no longer sharp, as viewed in section but are slightly relieved or contoured along at least part of their length.

When the sleeve member is caused to move along the valve core it progressively masks the pocket and so proportionately scales down that section of the orifice area curve comprising the "logarithmic scroll" feature and also the final rapid close-off. The angle through which the valve elements must be relatively rotated to approach close-off thus changes from a relatively large angle, where the pocket is unmasked, to a much smaller angle when it is fully masked by travel of the sleeve member. As a result, the angle through which the torsion bar must be twisted (and hence the effort applied by the driver to the steering wheel rim) is large in the former instance and much smaller in the latter. Hence the sleeve member is caused to take up a position which the pocket is substantially unmasked when the vehicle speed is high and to move progressively along the valve core with decreasing vehicle speed until the pocket is fully masked and hence steering efforts are very low, when parking.

In one form of the invention, the sleeve is moved along the valve core by a spring secured thereto which acts on the end face of the sleeve member. Exhaust oil escaping from the valve elements is caused to act on the annular area of the sleeve member at the end opposite the spring, and by modulating the escape pressure through a suitable valve (which may be located remotely from the steering gear), the sleeve member may be accurately positioned along its travel as a function of a vehicle speed signal. This arrangement has the additional advantage that the orifices within the valve operate against an increasing back pressure when the vehicle is moving slowly, so tending to suppress valve noises which, as is well known, occur in these instances. Alternatively the axial movement of the sleeve member may be effected by either direct mechanical or electro-mechanical means.

Various signals may be used other than, or in combination with, vehicle speed, for example vehicle lateral acceleration or angular turn of the steering wheel. Alternatively the sleeve member may be positioned via a driver operated control so that a wide range of valve assistance pressure characteristics can be selected manually.

One preferred embodiment of the invention is hereinafter described by way of example, with reference to the accompanying drawings.

FIG. 3 is a part-view in direction BB of FIG. 2;

Figure 1:
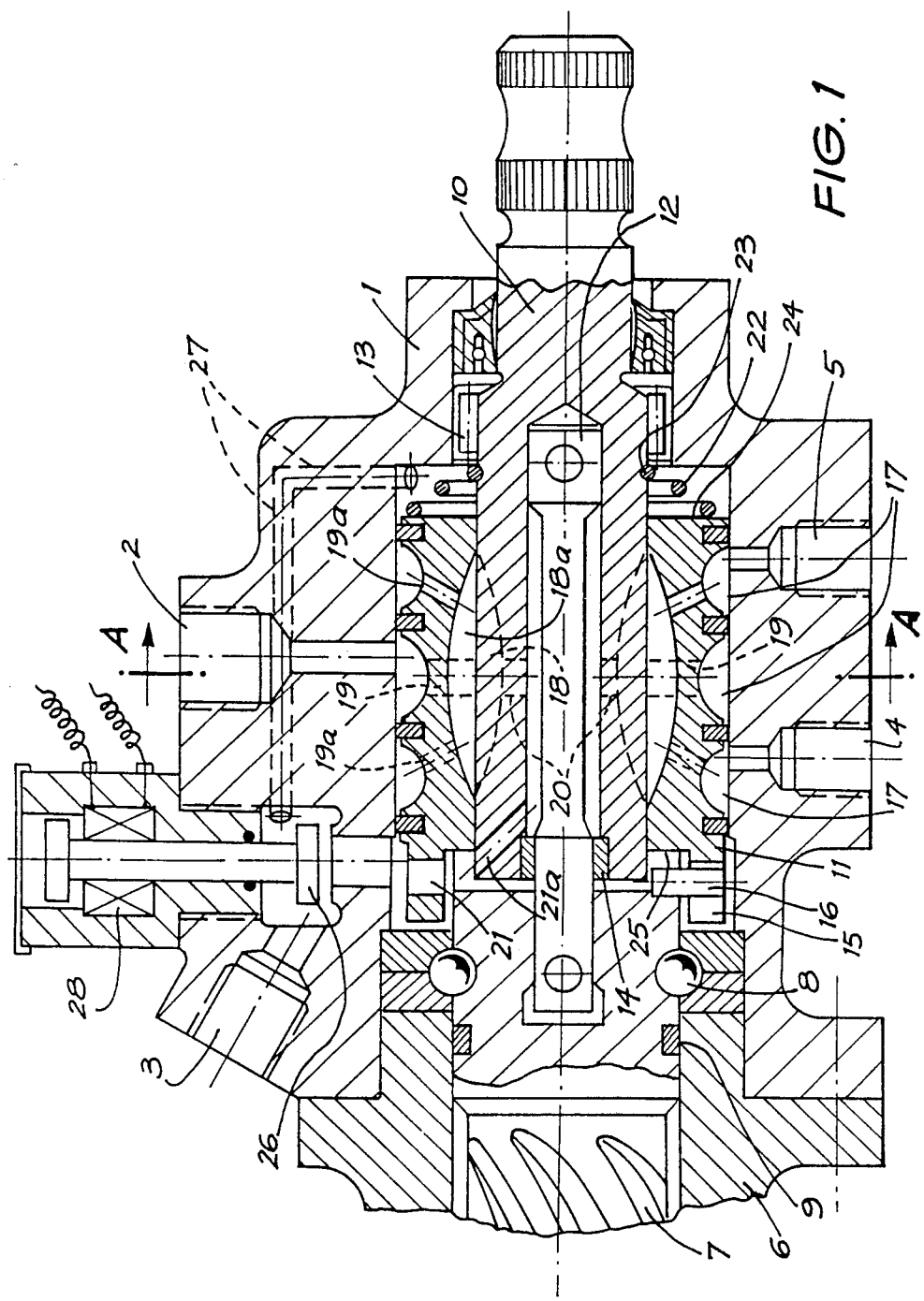
FIG. 1 is a section through the valve of a steering system made according to the invention.

Referring to FIG. 1, valve housing 1 is provided with pump inlet and return connections 2 and 3 respectively and right and left hand cylinder connections 4 and 5.

Steering gear housing 6, to which valve housing 1 is attached, contains the mechanical steering elements, for example, pinion 7, journalled by ball race 8 and provided with seal 9.

The three main valve elements comprise valve core-/input shaft 10, sleeve member 11 journalled thereon, and torsion bar 12. This torsion bar is secured by a pin to the valve core at one end and similarly to pinion 7 at the other. It also provides a journal for valve core input shaft 10 by way of a bush as at 14.

Sleeve member 11 has an annular extension having therein a slot 15 engaging pin 16 extending radially from pinion 7.

Valve core 10 and sleeve member 11 incorporate in their mating surfaces a plurality of longitudinally extending, blind ended grooves 18 and 18a respectively. Sleeve 11 is also provided on its outer periphery with a series of axially spaced circumferential grooves 17 separated by seals, each latter groove being connected by a plurality of radial holes 19 and 19a to the bore of the sleeve. Radial holes 20 in valve core 10 connect one or more grooves 18 to the centre hole in the valve whence return oil can flow via ports 21 and 21a to pump return conection 3.

In the normal operating condition of the valve illustrated in FIG. 1 volute spring 22, which is axially restrained on valve core 10 by groove 23 presses on the end face 24 of sleeve 11 so urging it into contact with the end face 25 of pinion 7. Sleeve 11 can be caused to move axially along valve core 10 to the right not withstanding the progressively increasing opposition of volute spring 22. The force necessary to so move the sleeve is provided by the difference of oil pressures acting on the annular areas at each end of the sleeve defined by the outer diameter of valve core 10 and internal diameter of housing 1.

These pressures are equal when valve 26 is fully open as illustrated in FIG. 1, by reason of the fact that drilled passages 27 vent the right hand annular area of the sleeve to pump return connection 3. Valve 26 can be progressively closed by applying a variable voltage to solenoid 28 so causing the progressive displacement of sleeve 11 to the right in accordance with the variable voltage signal.

It will be seen that the radially drilled holes of inlet and cylinder connections 2, 4 and 5 of housing 1 are axially offset with respect to the centre lines of the corresponding circumferential grooves of the sleeve so allowing sleeve 11 to slide axially to the right a limited distance without interruption to the flow of oil. Slot 15 also insures that pinion 7 always positively drives sleeve 11 via pin 16.

Figure 2:
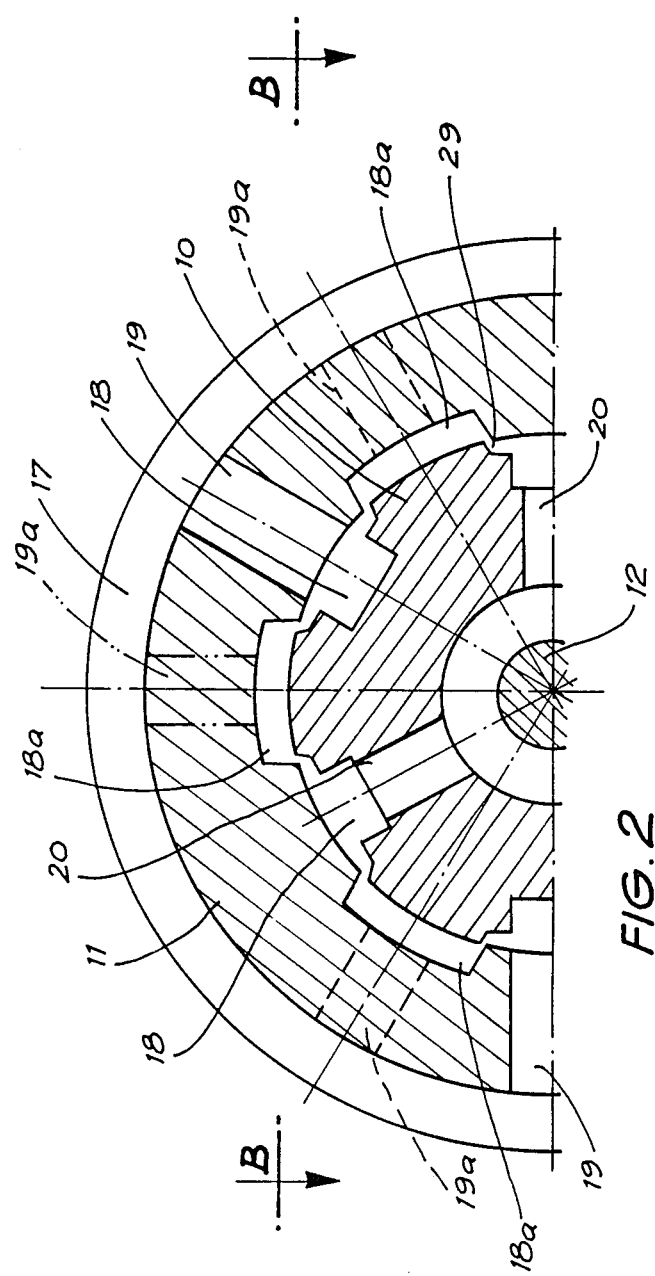
FIG. 2 is a part-section through AA of FIG. 1.

In FIG. 2 it will be seen that, in the neutral position of the valve illustrated, the longitudinal grooves 18a and 18 in the sleeve and valve core respectively overlap so providing relatively unrestricted balanced flow of oil between sleeve radial inlet ports 19 and radial return holes 20 in the valve core.

The manner in which the valve operates to direct oil to right and left cylinder ports 4 and 5 is well known in the art of such valves, and the featuring of valve groove edges 29 of valve core grooves 18 to improve the modulation of the valve is also a common practice.

However, the techniques of featuring the valve groove edges set out in U.S. Pat. No. 3,591,136 are particularly pertinent to the present invention in several respects. For example, in contrast to the usual practice, the featuring is asymetric along the length, with a short pocket 30 configuration at one end and an elongated relatively plain section 31 over the remainder of the length as illustrated in FIG. 3. Two longitudinal grooves 18a of sleeve member 11 are seen to partially overlap one groove 18 of the valve core. The termination of sleeve grooves 18a are illustrated chain dotted as at 32 in the normal position of the sleeve member 11, and in the fully axially displaced position of the latter at 32d.

Figure 5:
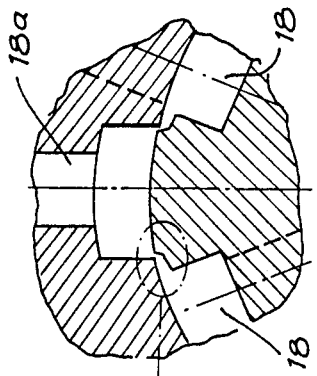
FIG. 5 is a section through DD of FIG. 3.
Figure 4:
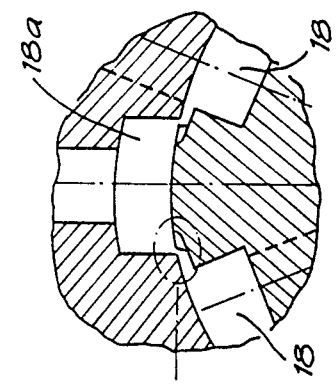
FIG. 4 is a section through CC of FIG. 3.
Figure 5A:
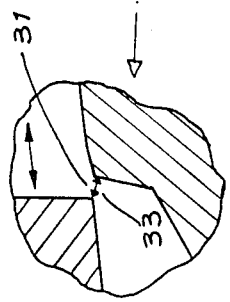
FIG. 5a is an enlarged version of a portion of FIG. 5.
Figure 4A:
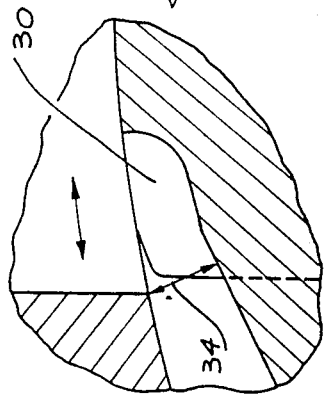
FIG. 4a is an enlarged version of a portion of FIG. 4.

FIG. 4 shows a section of the groove edges as at CC of FIG. 3 with an enlarged view of the short pocket section 30 shown in FIG. 4a. FIG. 5 shows a section of the groove edges as at DD of FIG. 3 with an enlarged view of the elongated groove edge 31 shown in FIG. 5a.

The orifice areas provided by the two sections of each of the featured grooves are substantially determined by the product of the length of the groove and the effective width which is the shortest distance between the edges of sleeve grooves 18a and of the adjacent edges of valve groove 18, being distances 33 and 34 for the long and short sections respectively. These distances change with relative rotation of sleeve and valve illustrated by the arrows in the respective enlarged views.

Figure 6:
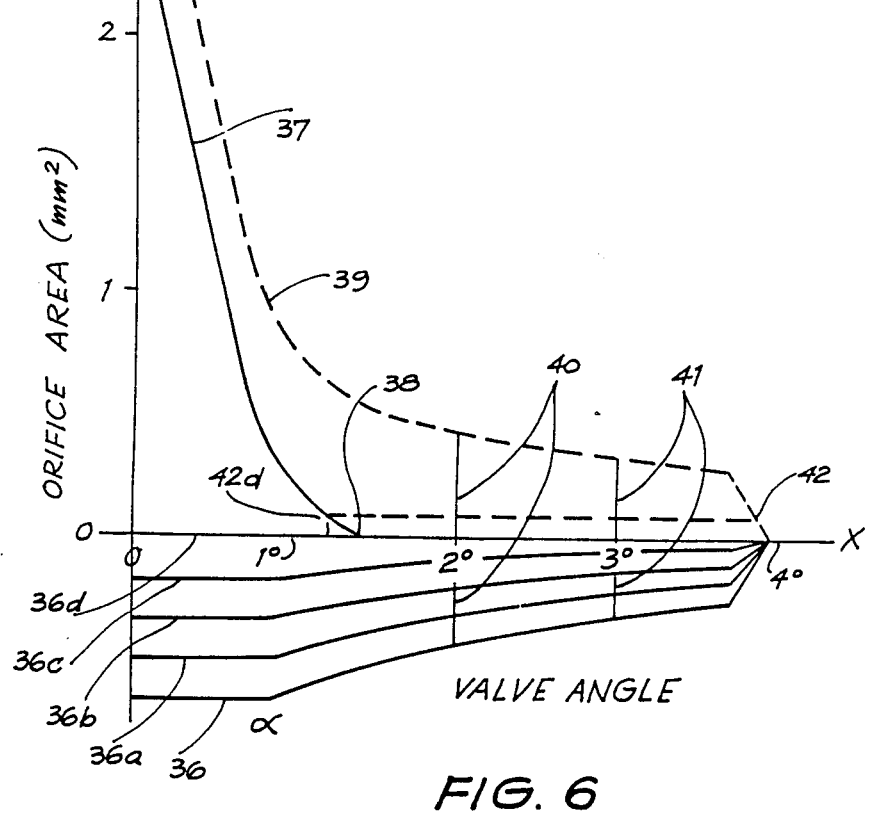
FIG. 6 is a graph showing a plot of the orifice area versus relative rotation of the valve elements.

FIG. 6 shows a graph with an X axis representing the relative rotation of the sleeve and valve-core edges from a centred position shown as 0 (zero) degrees to say a maximum operating travel of about 4 degrees, and with a Y axis representing individual orifice areas in square millimeters.

The area curve 37, which terminates on the X axis at point 38, represents the area provided by elongated groove edges 31 as they close from the 0 degrees or centred position of the valve. Area curve 36, which is here plotted below the X axis for convenience, shows the orifice areas provided by the short pocket 30.

The total area of the orifice at any angle is therefore the sum of the areas expressed by the area curves 36 and 37 and will appear as shown by dotted line 39. To the right of point 38 where curve 37 has reached zero, area curve 39 will be a mirror image about the X axis of area curve 36. In this region the area ordinate of curve 39 decreases approximately exponentially with increased relative valve rotation. Thus the ratio of area ordinate 40 at 2 degrees to area ordinate 41 at 3 degrees is approximately expressed by the relationship:

$$\frac{\text{Ordinate 40}}{\text{Ordinate 41}} = \sqrt{\frac{3° - \text{alpha}}{2° - \text{alpha}}}$$

where alpha is some threshold angle. This characteristic is similar to that provided by the "logarithmic scroll" groove edges of U.S. Pat. No. 3,591,136.

Because of the laws which apply to such orifices, as expressed by the approximate equation $P = K/A^2$, it follows that the pressure change between angles 2 alpha and 3 alpha will increase in proportion to the valve angle above the threshold angle alpha. In this equation P is the pressure restriction provided by an orifice, A is the orifice area in square millimeters, and K is some constant related to the flow of oil.

Line 36 shows the area provided when the sleeve occupies the position shown in FIG. 1 and lines 36a, 36b, 36c and 36d show the progressively lesser areas as the sleeve progressively moves to positions 32a, 32b, 32c and 32d of FIG. 3.

Now the area provided by elongated edges 31 as represented by area curve 37 is unaffected by the axial movement of the sleeve. It follows that the sum area curve 39 diminishes in vertical ordinate and eventually becomes coincident with line 37 (although this progressive change is not illustrated in FIG. 6) and that the angle at which area close-off occurs indicated by point 42 at about 4 degrees progressively reduces to the angle indicated by point 42d at about 1 degree. It will be noted that points 42 and 42d correspond to where a very small orifice area remains rather than zero area as this small area is that associated with maximum pump pressure.

Figure 7:
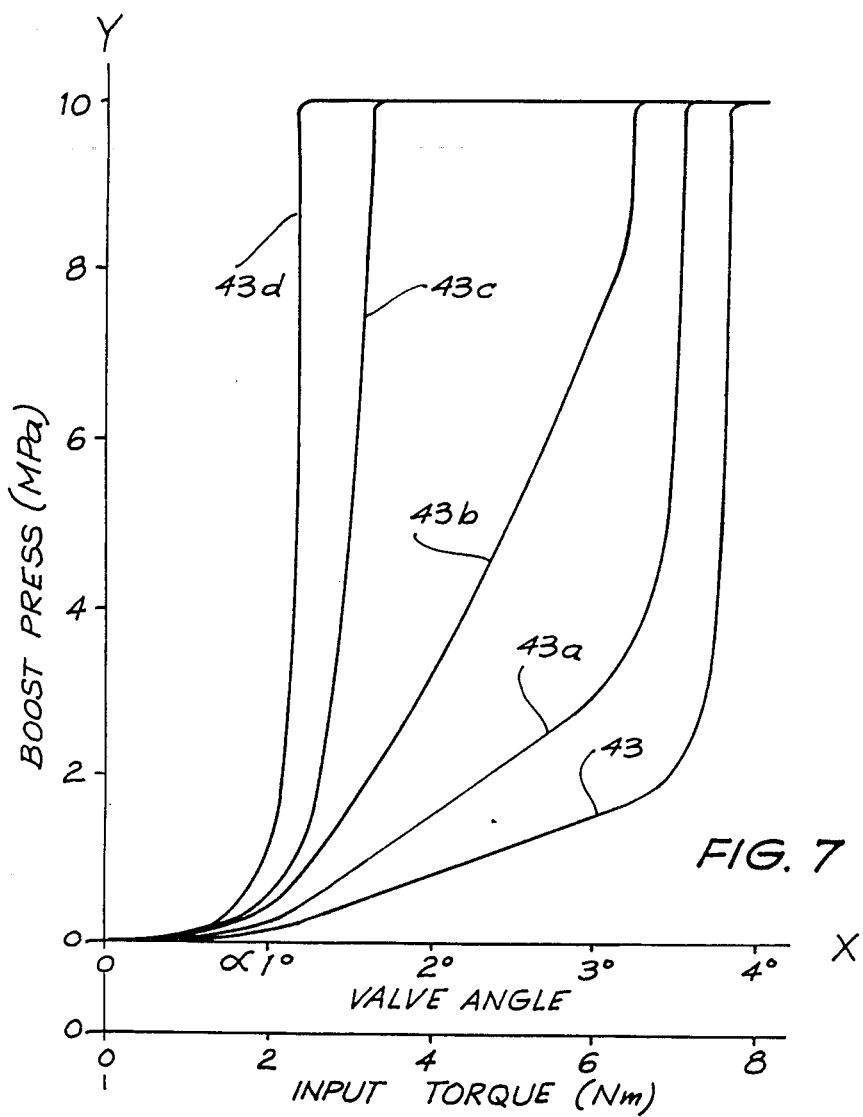
FIG. 7 is a graph showing a plot of the power-assistance pressure versus relative rotation of the valve elements, and also versus the steering input torque applied by the driver to the steering wheel.

The characteristics of operation of a valve of the type just described are shown in FIG. 7. Here the X axis again shows the valve angle but also, at a different scale, the input torque applied by the driver to the steering wheel. The two functions are directly related by the stiffness of the torsion bar 12, as is well known. In the case illustrated, 1 degree torsion bar deflection occurs for 2 Nm applied torque.

As will be anticipated from the foregoing description, assistance pressure lines 43, 43a, 43b, 43c and 43d are, over much of their length, substantially straight lines which, extended to the X axis, intersect at the threshold angle alpha.

Small deviations may occur which do not affect the basic principle underlying the invention.

The function of the slight relief or contour provided on the elongated groove edge 31 (FIGS. 5 and 5a) which results in the "flare out" of area curve 37 as it approaches the X axis at point 38 in FIG. 6 will now be described. It is well known in steering gears as in other servomechanisms that too fast a rate of cut-off within a control valve can result in instability or "chatter" of the device being controlled. The situation is improved if the final rate of cut-off is reduced, which is accomplished in the valve just described by the groove edge being relieved. This elongated relief also serves to break the flow of oil at high pressure (as when parking) into an elongated but thin jet, a technique well known in the art of steering valve design used to reduce valve noises such as hiss during parking. When this technique is used in simple valves it often enforces a compromise of the valve performance. However, in a valve made according to the present invention this elongated relief determines valve performance only at low vehicle speeds or parking maneouvres where short pocket 30 is masked off.

Figure 8:
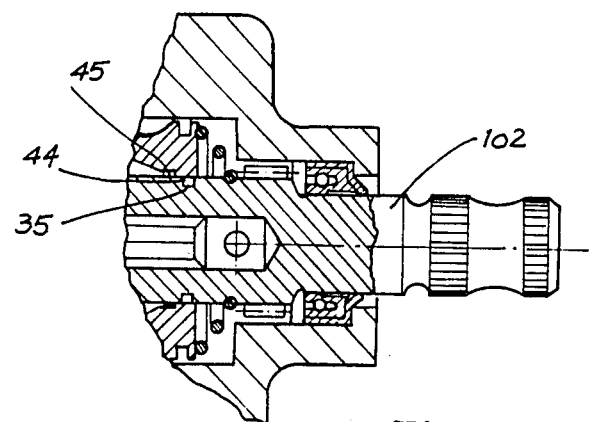
FIG. 8 is a scrap view in section of part of FIG. 1 showing an alternative version of the valve.

Another method used to avoid instability is to incorporate a damper ring (as taught in U.S. Pat. No. 3,022,772) which tends to lock the valve elements together when operating at high pressures. This, however, has the disadvantage of increasing valve hysteresis and therefore reduces road feel which is particularly undesireable at high speeds. According to this invention however such a damper ring may be employed as illustrated in FIG. 8 in such a manner that it is activated only during parking. Thus damper ring 44 is housed in a circumferential groove 35 in valve core 10a and is fed with oil from sleeve groove 18a by a communicating groove 45 only when the sleeve is displaced to its extreme right position as occurs during parking.

Many variations in the construction or operation of the valve just described are possible without detracting from main benefits provided.

For example the set linear assistance pressure lines of varying slope which is provided by the preferred embodiment may be replaced by a set of different characteristics each of which is entirely different one to the other. The heart of the concept lies in the provision of a family of assistance pressure curves which change progressively from low assistance pressure and high steering efforts at high speeds to high assistance pressure and low steering efforts at low speeds. The change from one mode to another occurs without steps or discontinuities, and no compromise in valve responsiveness occurs in the critical low effort zone near the centre region of valve operation. The maximum turning rate of the steering gear is not affected, and the frictional losses are minimal.

Although the foregoing description implies that all groove edges are featured in the same manner (for example as shown in FIGS. 3, 4 and 5) it will be evident that the same overall operation of the valve will result if the various features are arranged on different sets of edges. For example the "area curves" of FIG. 6 may alternatively be achieved by arranging only long edges 31 on some grooves, and only short pockets 30 on other grooves. Also it is possible that the groove edges of the valve core be made plain, and the edges of the sleeve member made to incorporate features similar to those described for the valve core. Obviously many other arrangements of the groove edges are possible without changing the operating principle of the valve.

The movement of the sleeve axially may be achieved by the solenoid-operated valve described, but, alternatively may be directly mechanically or electromechanically driven. For example, a miniature rotary actuator may be located on valve housing 1. This rotary actuator would be provided with a spindle extending inside the valve housing and have teeth thereon which engage a circular rack cut in the periphery of the sleeve member.

We claim:

1. A hydraulic control valve for a power assisted steering system for a vehicle, the valve comprising a sleeve member having a bore in the surface of which is a first set of longitudinally extending grooves separated by lands, a valve core fitting closely within the bore of the sleeve member and relatively rotatable therein, a second set of longitudinally extending grooves, also separated by lands, on the surface of the valve core, each groove of the first set lying opposite to a land of the second set, the width of some at least of the grooves or lands varying along their lengths, an axially extending torsion bar connecting the valve core to the sleeve member, means to conduct hydraulic fluid under pressure into and out of said grooves, relative rotation between the valve core and the sleeve member acting to vary the effective width and therefore the area of orifices defined by adjacent edges of opposing grooves and lands, and so to control the restriction to flow of hydraulic fluid within the valve and thus the power assistance provided to the system, characterised in that the sleeve member and the valve core are relatively movable axially to change the length and thus further change the area of said orifices available for the flow of hydraulic fluid and thereby alter the degree of assistance provided.

2. A hydraulic control valve as claimed in claim 1 wherein the valve core is fixed against axial movement and the sleeve member is axially movable thereon.

3. A hydraulic control valve as claimed in claim 1 having means responsive to a variable related to the mode of operation of the vehicle acting to displace the sleeve axially in relation to the core a distance that is a function of said variable.

4. A hydraulic control valve as claimed in claim 3 wherein the said variable is vehicle speed.

5. A hydraulic control valve as claimed in claim 3 or claim 4 wherein the said means responsive to said variable includes means to apply hydraulic fluid under pressure to move the sleeve member axially from an initial position against the force of a resilient member acting to urge the sleeve member towards said initial position.

6. A hydraulic control valve as claimed in claim 1 or claim 2 in which each of at least some of said orifices has a part along its length that on relative rotation of the valve core and sleeve member is of greater effective width and a part that is of lesser effective width, relative axial movement of the sleeve member and the valve core acting to mask at least a portion of the part of greater effective width.

7. A hydraulic control valve as claimed in claim 6 wherein the effective width of the part of greater width varies in an exponential fashion with relative rotation of the valve core and sleeve member over a part of said relative rotation.

8. A hydraulic control valve as claimed in claim 7 wherein the edge of a land bounding a part of an orifice of lesser width is relieved in such a manner as to break the flow of hydraulic fluid at high pressure into a thin elongated jet as said relative rotation progresses.

9. A hydraulic control valve as claimed in claim 1 including a damper ring accommodated in a groove in the valve core and having an outer surface in contact with an internal annular surface of said sleeve member when maximum relative axial movement between the valve core and the sleeve member has occurred, and means to direct hydraulic fluid under pressure to actuate said damper ring under that condition.

* * * * *